(12) United States Patent
Polak et al.

(10) Patent No.: US 10,336,581 B2
(45) Date of Patent: Jul. 2, 2019

(54) SYSTEM AND METHOD FOR REDUCING BELT NOISE

(75) Inventors: David R. Polak, Glastonbury, CT (US); Christopher T. Chipman, Killingly, CT (US); Charles C Coffin, Vernon, CT (US); Arthur Blanc, Providence, RI (US); John P. Wesson, Vernon, CT (US); Yan Chen, South Windsor, CT (US); Daniel G. Opoku, Montreal (CA); Sergei F. Burlatsky, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1292 days.

(21) Appl. No.: 13/980,621

(22) PCT Filed: Jan. 21, 2011

(86) PCT No.: PCT/US2011/022035
§ 371 (c)(1),
(2), (4) Date: Jul. 19, 2013

(87) PCT Pub. No.: WO2012/099604
PCT Pub. Date: Jul. 26, 2012

(65) Prior Publication Data
US 2013/0292211 A1    Nov. 7, 2013

(51) Int. Cl.
*B66B 11/08*    (2006.01)
*B66B 15/04*    (2006.01)
(Continued)

(52) U.S. Cl.
CPC ............... *B66B 11/08* (2013.01); *B66B 9/00* (2013.01); *B66B 15/04* (2013.01); *D07B 1/22* (2013.01);
(Continued)

(58) Field of Classification Search
CPC . B66B 11/08; B66B 9/00; B66B 15/04; F16H 55/36; F16H 57/0006
(Continued)

(56) References Cited

U.S. PATENT DOCUMENTS 3,430,506 A * 3/1969 Stone ........................... 198/835
4,553,951 A * 11/1985 Pavone ......................... 474/148
(Continued)

FOREIGN PATENT DOCUMENTS

CN    1489549 A    4/2004
CN    1935616 A    3/2007
(Continued)

OTHER PUBLICATIONS

Japanese Office Action for application JP 2013550459, dated Sep. 2, 2014, 3 pages.
(Continued)

*Primary Examiner* — Michael A Riegelman
(74) *Attorney, Agent, or Firm* — Cantor Colburn LLP

(57) ABSTRACT

The present invention is directed to an elevator system. The elevator system comprises a car, a counterweight, at least one belt connecting the car and counterweight, and at least one sheave having a surface that engages with the belt. At least part of the surface of the sheave that interfaces with the belt has a plurality of features for reducing unwanted noise created due to the interaction between the belt and the sheave surface.

19 Claims, 4 Drawing Sheets

(51) Int. Cl.
*F16H 55/36* (2006.01)
*F16H 57/00* (2012.01)
*B66B 9/00* (2006.01)
*D07B 1/22* (2006.01)
*D07B 5/00* (2006.01)

(52) U.S. Cl.
CPC ............ *D07B 5/006* (2015.07); *F16H 55/36* (2013.01); *F16H 57/0006* (2013.01); *D07B 2501/2007* (2013.01)

(58) Field of Classification Search
USPC ........................................................ 187/266
See application file for complete search history.

(56) References Cited

U.S. PATENT DOCUMENTS

| | | | |
|---|---|---|---|
| 4,898,567 | A | 2/1990 | Tatara et al. |
| 5,119,924 | A | 6/1992 | Kaminski |
| 6,488,123 | B2* | 12/2002 | Pitts et al. .................... 187/251 |
| 6,938,754 | B2* | 9/2005 | Kanaris ......................... 198/494 |
| 2003/0025109 | A1* | 2/2003 | Baranda et al. .............. 254/266 |
| 2008/0087500 | A1 | 4/2008 | Ach et al. |
| 2008/0105496 | A1* | 5/2008 | Yuasa et al. .................. 187/251 |
| 2008/0156592 | A1* | 7/2008 | Thompson et al. ........... 187/411 |
| 2008/0289912 | A1* | 11/2008 | Perron .......................... 187/411 |
| 2009/0120731 | A1* | 5/2009 | Thompson et al. ........... 187/401 |

FOREIGN PATENT DOCUMENTS

| | | |
|---|---|---|
| CN | 101365643 A | 2/2009 |
| CN | 201301158 Y | 9/2009 |
| EP | 0064576 A1 | 11/1982 |
| EP | 1777189 A1 | 4/2007 |
| EP | 2210847 A1 | 7/2010 |
| FR | 2803587 A1 | 7/2001 |
| GB | 168043 A | 8/1922 |
| GB | 718790 A | 11/1954 |
| JP | H01150070 A | 6/1989 |
| JP | 10318353 A | 12/1998 |
| JP | 2006125537 A | 5/2006 |
| JP | 2010540374 A | 12/2010 |
| KR | 970008373 B1 | 5/1997 |

OTHER PUBLICATIONS

Chinese First Office Action and Search Report for application CN 201180065498.4, dated Nov. 21, 2014, 11 pages.
Korean Office Action for application KR1020147021677, dated Mar. 16, 2015, 7 pages.
Russian Office Action for application 2013125716/11(37966) dated Apr. 10, 2015, 4 pages.
Notification of Transmittal of the International Preliminary Report on Patentability of the International Searching Authority, or the Declaration; PCT/US2011/022035; dated Aug. 1, 2013.
European Extended Search Report for EP11856439, dated Feb. 12, 2016, 8 pages.

* cited by examiner

SYSTEM AND METHOD FOR REDUCING BELT NOISE

BACKGROUND OF THE INVENTION

This invention generally relates to systems in which a belt interacts with a pulley (some technologies refer to pulleys as sheaves). More particularly, this invention relates to systems, such as lifting devices or power transmission devices (e.g. drive belts) in which the interaction between the belt and the pulley may produce undesired noise.

Elevator systems are one example of the aforementioned lifting devices. Some elevator systems are traction elevator systems that use one or more belts to support and/or provide a lifting force to the elevator car and/or the counterweight. The belts can comprise a plurality of tension members, such as cords formed from steel wire, within a jacket, such as a polymer. The belts route around one or more sheaves of the elevator system, typically made of metal, to perform these functions.

These elevator systems rely upon sufficient traction between a sheave driven by the elevator machine (referred to as a drive sheave and/or traction sheave) and the belt for several reasons. First, sufficient traction ensures that the belt moves along with the drive sheave during rotation of the drive sheave by the elevator machine in order to achieve the desired movement of the car and/or counterweight. Second, sufficient traction ensures that the belt does not move relative to the drive sheave when the drive sheave is not rotating in order to keep the elevator car at a desired position (e.g. when the elevator car is at a landing).

These elevator systems may also include one or more other sheaves that help guide the belt around various components of the elevator system in a desired arrangement (referred to as deflector sheaves, idler sheaves and/or diverter sheaves).

Under certain conditions, the belt could slip relative to the sheave. This slip condition could produce an undesired noise. The undesired noise could be airborne (e.g. travelling through the air in the hoistway) or structure borne (e.g. travelling along the belt to other components of the elevator system).

A variety of approaches have been proposed for reducing or eliminating such noise. Most of those efforts have focused on the belt. Exemplary approaches include using a different jacket material, adjusting the wax content in the jacket material, or periodically conditioning the installed belt (e.g. applying a wax to the jacket).

SUMMARY OF THE INVENTION

The present invention is directed to an elevator system. According to one aspect of the invention, the elevator system comprises a car, a counterweight, at least one belt connecting the car and counterweight, and at least one sheave having a surface that engages with the belt. At least part of the surface of the sheave has a plurality of features that reducing unwanted noise created by the interacted between the surface and the belt.

Alternatively or in addition to this or other aspects of the invention, the plurality of features on the surface of the sheave is made up of either indentations, projections or a combination thereof.

Alternatively or in addition to this or other aspects of the invention, wherein the coverage ratio of the plurality of features is in the range of 20 to 80 percent.

Alternatively or in addition to this or other aspects of the invention, the angular spacing between each of the plurality of features ranges between 3 and 5 degrees of the central angle of the sheave.

Alternatively or in addition to this or other aspects of the invention, the plurality of features, specifically indentations and/or projections, on the surface of the sheave are identical.

Alternatively or in addition to this or other aspects of the invention, the plurality of features are arranged randomly.

Alternatively or in addition to this or other aspects of the invention, the plurality of features are arranged in a pattern.

Alternatively or in addition to this or other aspects of the invention, the sheave is a deflector sheave in an elevator system.

Alternatively or in addition to this or other aspects of the invention, the plurality of features produces a pressure distribution at the interface between the surface of the sheave and the belt. The pressure distribution has regions with a first pressure and regions with a second pressure. The second pressure is lower than the first pressure.

Alternatively or in addition to this or other aspects of the invention, the region of second pressure is in the ranges from 0 to about 50% of the first pressure.

According to another aspect of the invention, a pulley comprises a surface for engaging with a belt and a means for reducing unwanted noise caused by the interaction between the surface and said belt.

According to another aspect of the invention, a pulley comprises a surface for engaging with a belt and a plurality of features on said surface for reducing unwanted noise created from the interaction between the surface and the belt.

Alternatively or in addition to this or other aspects of the invention, the pulley is a deflector sheave, also referred to as an idler sheave, in an elevator system.

According to another aspect of the invention, a method for reducing unwanted noise at the interface of a pulley and a belt comprising providing a pulley with at least one surface that engages with a belt, and providing a plurality of features of said surface.

Alternatively or in addition to this or other aspects of the invention, the plurality of features comprises indentations, projections, or a combination thereof.

DETAILED DESCRIPTION

Figure 1:
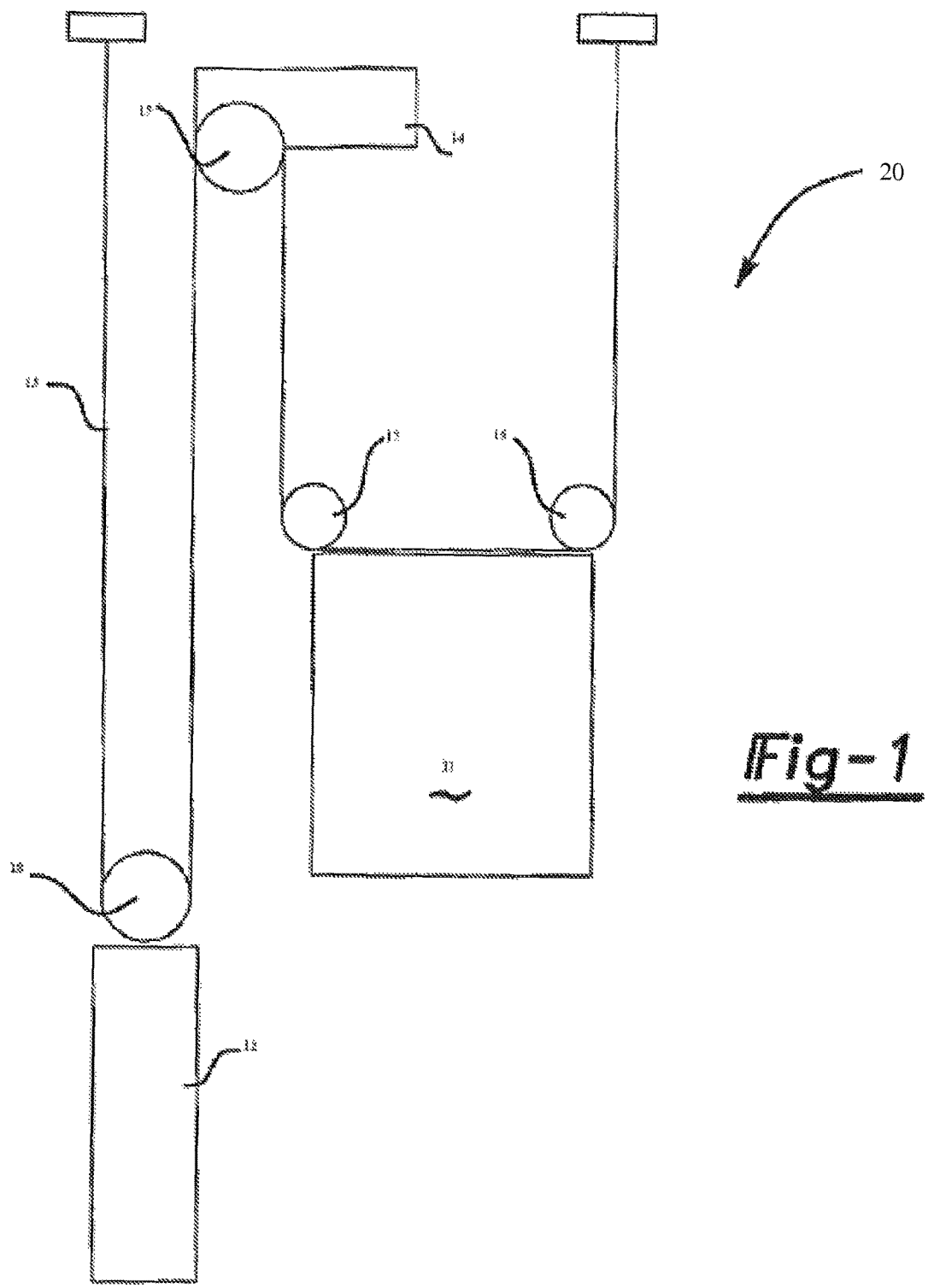
FIG. 1 schematically shows an exemplary elevator system including a sheave designed according to this invention.

FIG. 1 is a schematic illustration of an exemplary fraction elevator system 20. Components of the elevator system 20 not relevant to the present invention (e.g. guide rails, controller, safeties etc.) will not be discussed. The elevator system 20 includes an elevator car 11 operatively suspended or supported in a hoistway with at least one belt 13. The number of belts 13 used in the elevator system 20 is determined by factors not related to the present invention. The one or more belts 13 could also be connected to a counterweight 12 that helps balance the elevator system 20 and maintain belt tension on both sides of a traction sheave 15 (also referred to as a drive sheave) during operation.

A machine 14 rotates the traction sheave 15. Since the belts 13 engage the traction sheave 15, rotation of the traction sheave 15 moves the belts 13 thus moving the elevator car 11 and counterweight 12.

The schematic illustration of the elevator system 20 in FIG. 1 includes multiple deflector sheaves 16, 17, 18 (also referred to as idler sheaves or diverter sheaves). The deflector sheaves could be associated with the car 11 (i.e. deflector sheaves 16, 17), with the counterweight 12 (i.e. deflector sheaves 18), or with the machine 14 or mounting structure of the machine 14 (not shown). Deflector sheaves 16, 17, 18 guide or direct the belts 13 during movement of the elevator system 20. Although FIG. 1 shows an overslung arrangement with the deflector sheaves 16, 17 located above the car 11, the present invention could be used with other arrangements, such as an underslung arrangement with the deflector sheaves 16, 17 located below the car 11. Similarly, although FIG. 1 shows a 2:1 roping arrangement, the present invention could be used with other roping arrangements. The deflector sheaves 16, 17, 18 generally act to guide the belts 13 without requiring traction between those sheaves and the belts 13.

Figure 2:
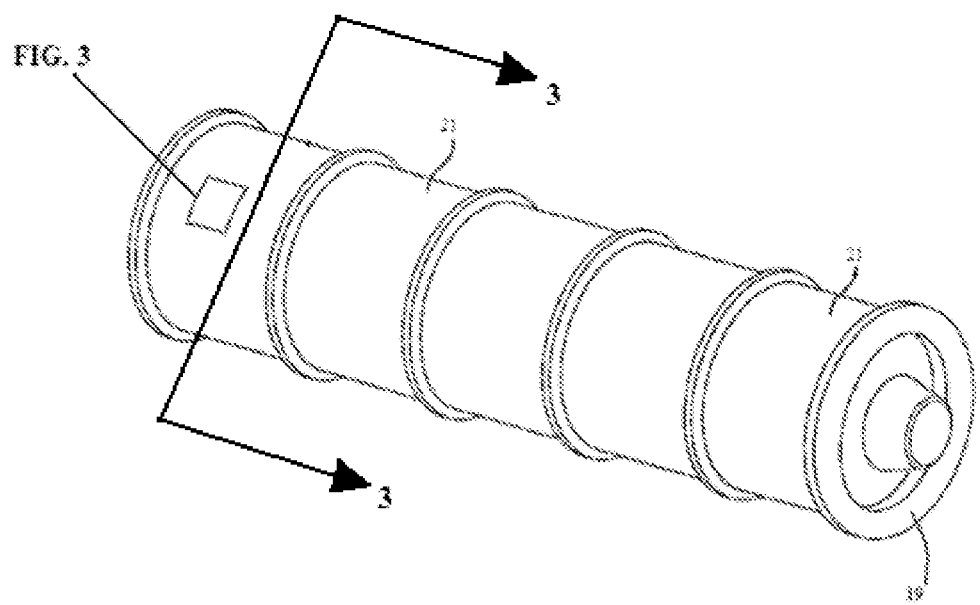
FIG. 2 is a perspective, diagrammatic illustration of an example of a sheave designed according to this invention.

FIG. 2 shows an exemplary sheave 19 representative of any one or more of the sheaves in contact with one or more of the belts 13 in an elevator system. In other words, the sheave 19 could be a deflector sheave 16, 17, 18 and/or a traction sheave 15. The sheave 19 includes one or more surfaces 21 for engagement with the one or more belts 13. The sheave 19 could have an equal or greater number of surfaces 21 than the number of belts in the elevator system, or could have one or more surfaces 21 that engage multiple belts 13. Sheave 19 could have a diameter in the range of between about 50 mm and about 250 mm.

FIG. 2 shows the sheave 19 having a crowned sheave surface 21 for engaging a generally flat belt 13. However, the present invention could also be used with other types of sheaves 19 that could engage other types of flat belts. For example, the sheave 19 could have a flat cross section if another means of guidance was utilized. Alternately, the sheave 19 could have circumferential grooves in the sheave surface 21 to accommodate the ribs of a so-called "poly-V" belt 13.

Sheave 19 includes an arrangement of geometric features on the sheave surface 21. In one alternative, the features populate the entire circumference of the sheave surface 21 (the circumferential direction also being the rotation direction of the sheave 19) which enable or allow localized relaxation of strain energy in the jacket material as the jacket passes over the sheave. In the axial direction (i.e. along the length of the sheave 19), the features can populate the entire sheave surface 21 or just a portion of sheave surface 21. In one alternative, the features can reside on the portion of the sheave surface 21 that the belt 13 may contact during operation of the elevator system 20. In other words, the features need not be applied to portions of the sheave surface 21 that will not contact the belt 13 during operation of the elevator system 20.

Generally speaking, the features on the sheave 19 are designed and/or arranged to affect the interaction between the belt 13 and the sheave 19. The features on the sheave 19 help mitigate the effects of strain energy buildup by enabling local surface slip between the belt 13 and the sheave 19. Without these features on the sheave 19, the build-up of strain energy caused by shear between the belt 13 and the sheave 19 results in a stick-slip behavior which could produce structure-borne noise, by generation of an impulse that travels longitudinally along the length of the belt 13 and propagates through the elevator system 20, and/or airborne noise.

The features on the sheave 19 could be indentations and/or projections 22. In other words, the sheave 19 could have all indentations, all projections or a combination of indentations and projections. The indentations/projection 22 may have any suitable shape, including but not limited to any of the following individually or in combination: circles, ovals, triangles, rectangles, hexagons, and trapezoids, straight lines, and wavy lines. An indentation/projection 22 may be identical to one or more of the other indentations/projections 22 on the sheave 19, have the same shape (but a different size) as one or more of the other indentations/projections 22 on the sheave 19, or have a different shape than the other indentations/projections 22 on the sheave 19.

Figure 3A:
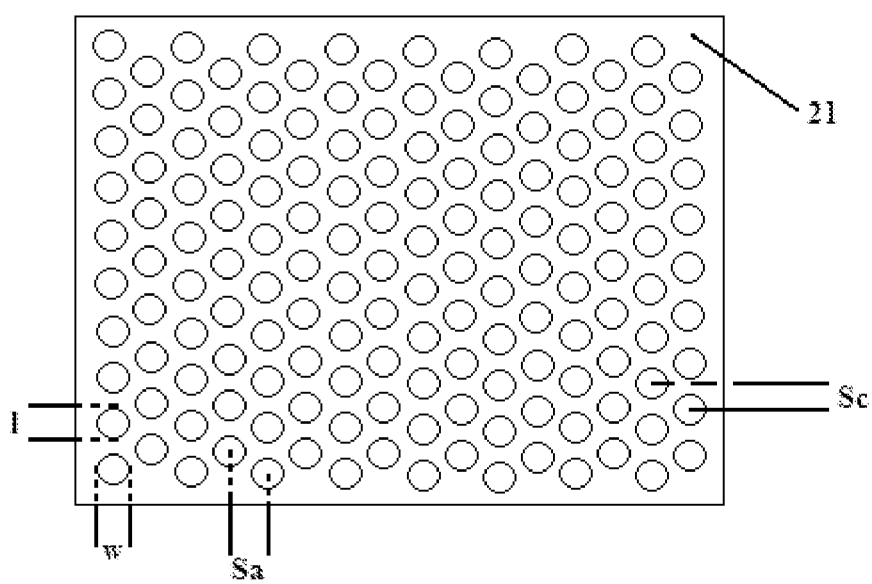
FIG. 3A is a magnified illustration of the section of the sheave indicated in FIG. 2 showing one possible embodiment of the sheave surface.

The features on the sheave 19 could be arranged in a regular pattern, such as the exemplary rectilinear possibility shown in FIG. 3A or a curvilinear arrangement (e.g. a helicoid). Alternatively, the features could be arranged in an irregular pattern, namely a pattern that is non-uniform and/or non-symmetric, such as the one exemplary possibility shown in FIG. 3B. Even further alternatively, the irregular pattern could be a random pattern, such as the one exemplary possibility shown in FIG. 3C.

Figure 3B:
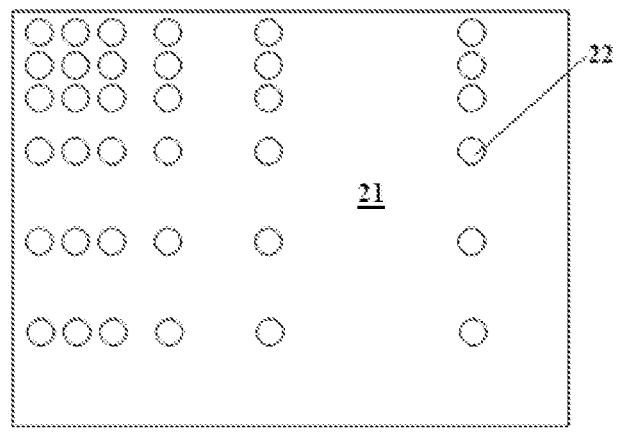
FIG. 3B is a magnified illustration of the section of the sheave indicated in FIG. 2 showing another possible embodiment of the sheave surface.
Figure 3C:
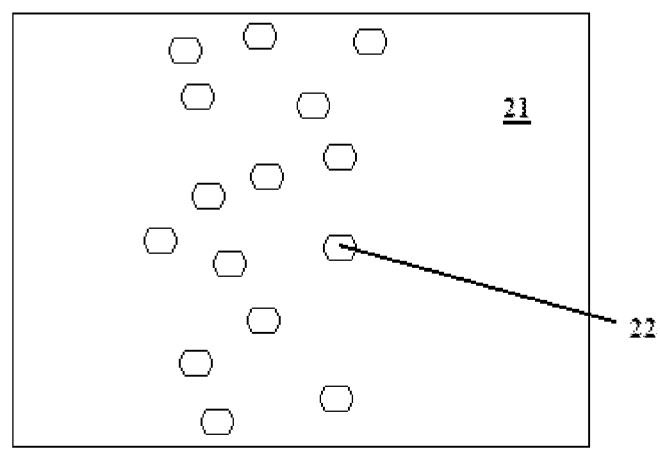
FIG. 3C is a magnified illustration of the section of the sheave indicated in FIG. 2 showing another possible embodiment of the sheave surface.
Figure 3D:
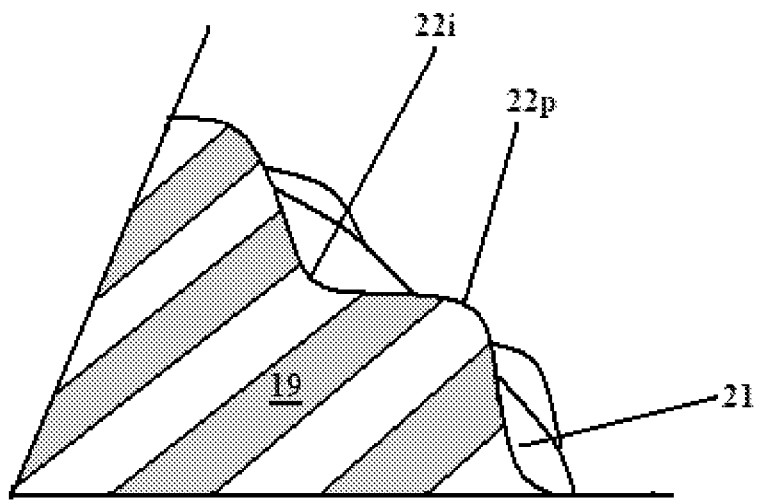
FIG. 3D is a magnified illustration of a portion of the cross-section of the sheave taken along line 3-3 of FIG. 2 showing another possible alternate embodiment of the sheave surface.
Figure 3E:
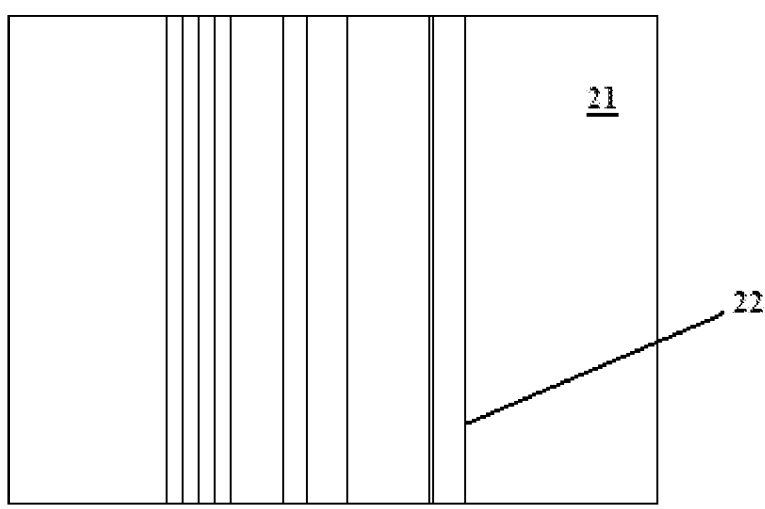
FIG. 3E is a magnified illustration of the section of the sheave indicated in FIG. 2 showing another possible alternate embodiment of the sheave surface.

The features on the sheave 19 could be discrete, such as the exemplary arrangements of FIGS. 3A, 3B and 3C. In other words, the features could be spaced apart so as to be discontinuous in the circumferential and axial direction of the sheave 19. Alternatively, the features on the sheave 19 could be continuous in the circumferential and/or axial direction of the sheave 19. FIGS. 3D and 3E show two possible arrangements of this alternative. In FIG. 3D, the sheave 19 includes indentations 22$i$ immediately adjacent to projections 22$p$ so as to produce a continuously wavy sheave surface 21. In FIG. 3E, an indentation/projection 22 is continuous in the circumferential direction of the sheave 19 (i.e. the indention/projection is now a groove/rib 22). The groove/rib 22 could alternatively be continuous in the axial direction of the sheave 19. In either event, the groove/rib 22 need not be rectilinear—the groove/rib 22 could be curvilinear (e.g. wavy). As will become more clear below, grooves such as those described with reference to FIG. 3E are not intended to receive the belt (or a feature of the belt, such as a rib of a poly-V type belt) for guidance and/or for providing traction.

Various techniques could be used (individually or in combination) to provide the indentations/projections 22 to the sheave 19. For example, mechanical techniques (e.g. machining, peening) and/or chemical techniques (e.g. etching) could be used to form the indentations into and/or projections from the sheave surface 21.

Another alternative or additional technique to provide the indentations/projections 22 to the sheave 19 to enable local relaxation of strain energy involves placing over all or part of the sheave surface 21 a secondary material, such as an adhesive tape or ring. In one possibility, discrete pieces of tape or rings, for example made from a low friction material such as polytetrafluroethylene, are applied to the sheave surface 21 (i.e. forming the projections). In another possibility (similar to a stencil template), tape having apertures therein is applied to the sheave surface 21. In yet another possibility, tape including both the indentations and projections is applied to the sheave surface 21. In another possibility, paint is applied to the sheave surface 21 with a mask to create a pattern of projections 22.

The features on the sheave 19 can have various attributes (e.g. depth/height, length, width, spacing, etc.). These attributes may depend on other attributes either directly (e.g. the width of a circular indentation equals the length) or indirectly (e.g. the depth of an indentation may be limited by the length/width of the indentation), and may depend on other aspects of the elevator system (e.g. wrap angle, belt jacket material, roping arrangement, elevator loading, belt speed, etc.). In light of these other elevator system aspects, the various attributes of the features are selected to achieve the desired effect on the interaction between the belt 13 and the sheave 19. In other words, these various attributes of the features are chosen to reduce unwanted noise at the interaction between the belt 13 and the sheave 19.

In one implementation, the depth of the indentation 22 should be sufficient so that the belt 13, during operation of the elevator system, does not contact the surface of the indentation 22. In other words, a gap should exist between the belt 13 and the indentation. As an example, a 150 mm diameter sheave that engages a 30 mm wide belt with a thermoplastic polyurethane jacket could have an indentation 22 with a depth of greater than about 30 μm (microns). Alternatively, contact with the surface of the indentation can occur if the local pressure is insufficient to prevent local slip and therefore allow relaxation.

The height of the projection 22 should be sufficient to lift adjacent sections of the belt 13 from the sheave surface, during operation of the elevator system, to enable relaxation of the strain energy. Alternatively, the contact pressure in these sections adjacent to projections 22 should be low enough to allow local slip and relaxation to dissipate strain energy to inhibit impulse generation. As an example, a 100 mm diameter sheave that engages a 30 mm wide belt with a thermoplastic polyurethane jacket could have a projection 22 with a height of 20-100 microns. In one embodiment, the height may range from approximately 20 to 30 microns.

The width w (see FIG. 3A) of the indentation/projection 22 should have a minimum value such that the indentation/projection 22 alters the interaction between the belt 13 and the sheave 19. The width w of the indentation/projection 22 should also have maximum value, for example at a point where further incremental changes to width w no longer impact the interaction between the belt 13 and the sheave 19 or where the indentation/projection 22 begins to affect negatively the elevator system (e.g. increased belt wear, additional acoustic noise, etc.). As an example, a 100 mm diameter sheave that engages a 30 mm wide belt with a thermoplastic polyurethane jacket could have an indentation 22 with a minimum width w in the range of between about 1 mm and about 2 mm and a maximum width w in the range of between about 5 mm and about 6 mm.

Similarly, the length l (see FIG. 3A) of the indentation/projection 22 should have a minimum value such that the indentation/projection 22 alters the interaction between the belt 13 and the sheave 19. The length l of the indentation/projection 22 should also have maximum value, for example at a point where further incremental changes to length l no longer impact the interaction between the belt 13 and the sheave 19 or where the indentation/projection 22 begins to affect negatively the elevator system (e.g. increased belt wear, additional acoustic noise, etc.). As an example, a 100 mm diameter sheave that engages a 30 mm wide belt with a thermoplastic polyurethane jacket could have an indentation 22 with a minimum length l in the range of between about 1 mm and about 2 mm and a maximum length l in the range of between about 5 mm and 6 mm.

The spacing between indentations/projections 22 could be described in several ways. A first possibility of describing spacing is using the distance between adjacent indentations/projections 22. As an example, a 100 mm diameter sheave that engages a 30 mm wide belt with a thermoplastic polyurethane jacket and having 2.5 mm circular indentations/projections 22 could have a spacing in the axial direction Sa (see FIG. 3A) in the range of between about 2.5 mm and about 7.5 mm between centers of adjacent indentations/projections 22, and a spacing in the circumferential direction Sc (see FIG. 3A) in the range of between about 2.5 mm and about 7.5 mm between centers of adjacent indentations/projections 22. The axial spacing of the indentations/projections 22 can be different than, or the same as, the circumferential spacing of the indentations/projections 22. This first possibility of describing spacing can be suitable for example with a regular pattern of features such as the exemplary arrangement shown in FIG. 3A.

A second possibility of describing spacing is using angular distance. As an example, a 100 mm diameter deflector sheave that engages a 30 mm wide belt with a thermoplastic polyurethane jacket could have an angular spacing between the indentations/projections 22 along the circumference of the sheave 19 in the range of between about 3° and about 5° of the central angle of the sheave 19. That means, for example with sheaves having a wrap angle of about 90° (e.g. deflector sheaves 16, 17 in FIG. 1) the belt 13 could contact between about 18 to about 30 features along the circumference of the sheave 19 at any given time. With sheaves having a wrap angle of about 180° (e.g. deflector sheave 18 or traction sheave 15 in FIG. 1) the belt 13 could contact between about 36 to about 60 features along the circumference of the sheave 19 at any given time.

A third possibility of describing spacing is using the coverage ratio of the indentations/projections 22. The phrase "coverage ratio" means the ratio of the projected area of the indentations/projections 22 to the total area of the sheave surface 21 receiving such indentations/projections 22 (which, depending on the specific alternative used, could be the entire sheave surface 21, the one or more contact areas, or just a portion of the one of more contact areas). As an example, a 100 mm diameter sheave that engages a 30 mm wide belt with a thermoplastic polyurethane jacket could have a coverage ratio in the range of between about 20% and about 80%. In one alternative of this example, the coverage ratio could be about 50%. This third possibility of describing spacing can be suitable for example with irregular patterns (e.g. non-uniform, non-symmetric and/or random) such as the exemplary arrangements shown in FIGS. 3B, 3C and 3D.

As discussed above, the features on the sheave 19 affect the interaction between the belt 13 and the sheave 19. At the interface between the belt 13 and sheave 19, the features create regions of lower pressure and regions of higher pressure. The difference between "lower" pressure and "higher" pressure should be significant enough to produce a desired and/or noticeable effect on the interaction between the belt 13 and the sheave 19. As an example, a "lower" pressure could be in the range of between about 0% and about 50% of the "higher" pressure.

This pressure distribution dissipates the strain energy caused by slip between the belt 13 and the sheave 19 at multiple locations (i.e. at the boundaries of the lower and higher pressure regions). With the dissipation of strain energy now occurring at multiple locations, there is less build-up of strain energy. This produces less structure-borne noise, since smaller (if any) impulses travel longitudinally along the length of the belt 13 to propagate through the elevator system 20, and/or airborne noise. As an example, a 100 mm diameter sheave having 2.5 mm circular indentations/projections 22 engaging a 30 mm wide belt with a thermoplastic polyurethane jacket can reduce the amplitude of the impulse by approximately 80% and reduce noise by approximately 12 dB.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. An elevator system, comprising:
   an elevator car;
   a counterweight;
   at least one belt connecting the car and counterweight; and
   at least one sheave having at least one surface for engagement with the at least one belt;
   wherein said at least one belt is flat and at least part of the at least one surface has a plurality of features thereon configured to interact with the belt for reducing unwanted noise from interaction between the surface and the at least one belt;
   wherein the plurality of features comprises at least one of indentations or projections.

2. The elevator system according to claim 1, wherein a coverage ratio of the plurality features is in the range of between 20% and 80%.

3. The elevator system according to claim 1, wherein the plurality of features have an angular spacing there between in the range of between 3° and 5° of a central angle of the sheave.

4. The elevator system according to claim 1 wherein the plurality of features are all identical.

5. The elevator system according to claim 1, wherein the features are arranged randomly.

6. The elevator system according to claim 1, wherein the features are arranged in a pattern.

7. The elevator system according to claim 1, wherein the at least one sheave is a deflector sheave.

8. The elevator system according to claim 1, wherein the features produce a pressure distribution at an interface between the surface and the at least one belt having regions with a first pressure and regions with a second pressure less than the first pressure.

9. The elevator system according to claim 8, wherein the second pressure is in the range of between 0% and 50% of the first pressure.

10. A pulley for interacting with at least one belt, the pulley comprising:
    a surface for engaging the at least one belt; and
    a plurality of features on the surface for reducing unwanted noise from the interaction between the surface and the at least one belt, wherein said at least one belt is flat and said plurality of features are configured to interact with the belt for reducing unwanted noise from interaction between the surface and the at least one belt;
    wherein the plurality of features comprises at least one of indentations or projections.

11. The pulley according to claim 10, wherein the pulley is a deflector sheave of an elevator system.

12. The pulley according to claim 10, wherein a coverage ratio of the plurality features is in the range of between 20% and 80%.

13. The pulley according to claim 10, wherein the plurality of features have an angular spacing there between in the range of between 3° and 5° of a central angle of the pulley.

14. The pulley according to claim 10, wherein the plurality of features are all identical.

15. The pulley according to claim 10, wherein the features are arranged randomly.

16. The pulley according to claim 10, wherein the features are arranged in a pattern.

17. The pulley according to claim 10, wherein the plurality of features produce a pressure distribution at an interface between the surface and the at least one belt having regions with a first pressure and regions with a second pressure less than the first pressure.

18. The pulley according to claim 17, wherein the plurality of features produce the second pressure in the range of between 0% and 50% of the first pressure.

19. A pulley for interacting with at least one belt, the pulley comprising:
    a surface for engaging the at least one belt; and
    a plurality of features on the surface for reducing unwanted noise from the interaction between the surface and the at least one belt, wherein said at least one belt is flat and said plurality of features are configured to interact with the belt for reducing unwanted noise from interaction between the surface and the at least one belt, wherein the plurality of features comprises at least one of indentations or projections;
    wherein the plurality of features on the at least one surface of the at least one sheave are configured to provide local surface slip between the at least one belt and the at least one surface to dissipate strain energy caused by shear between the at least one belt and the at least one surface.

* * * * *